United States Patent [19]

Johnson et al.

[11] Patent Number: 5,069,509
[45] Date of Patent: Dec. 3, 1991

[54] ENDLESS TRACK CHAIN WITH ROTATABLE SLEEVE

[75] Inventors: Mark L. Johnson, Peoria; Thomas E. Oertley, Dunlap, both of Ill.

[73] Assignee: Caterpillar Inc., Peoria, Ill.

[21] Appl. No.: 540,042

[22] Filed: Jun. 18, 1990

[51] Int. Cl.⁵ .................... B62D 55/092; B62D 55/21
[52] U.S. Cl. ....................... 305/58 PC; 305/58 R; 305/11
[58] Field of Search ............ 305/11, 14, 58 R, 58 PC, 305/59; 474/43, 44, 112; 285/94; 184/15.1

[56] References Cited

U.S. PATENT DOCUMENTS

| | | | |
|---|---|---|---|
| 1,658,303 | 2/1928 | Root | 305/14 X |
| 2,614,006 | 10/1952 | Bechman | 305/11 |
| 3,073,657 | 1/1963 | Oxford | 305/11 |
| 3,492,054 | 1/1970 | Boggs et al. | 305/11 |
| 3,554,588 | 1/1971 | Reinsma et al. | 305/58 R X |
| 4,099,795 | 7/1978 | Roley | 305/18 |
| 4,120,537 | 10/1978 | Roley et al. | 305/14 |
| 4,149,758 | 4/1979 | Livesay | 305/11 |
| 4,191,431 | 3/1980 | Roley et al. | 305/18 |
| 4,240,642 | 12/1980 | Roussin | 305/11 X |
| 4,311,327 | 1/1982 | Ortloff et al. | 285/94 X |
| 4,392,657 | 7/1983 | Roley | 305/11 X |
| 4,582,366 | 4/1986 | Burfield et al. | 305/11 |
| 4,594,846 | 6/1986 | Livesay et al. | 305/11 X |
| 4,618,190 | 10/1986 | Garman et al. | 305/58 R X |
| 4,639,995 | 2/1987 | Garman et al. | 29/402.08 |
| 4,819,999 | 4/1989 | Livesay | 305/11 |

FOREIGN PATENT DOCUMENTS

| | | |
|---|---|---|
| 657146 | 2/1938 | Fed. Rep. of Germany . |
| 2655664 | 6/1977 | Fed. Rep. of Germany . |
| 245252 | 7/1947 | Switzerland . |

*Primary Examiner*—Russell D. Stormer
*Attorney, Agent, or Firm*—O. Gordon Pence

[57] ABSTRACT

An endless track chain is provided with a rotatable sleeve that is mounted about the track bushing to provide the track with longer external bushing life. The rotatable sleeve is sealed and lubricated, as is the standard track joint. However, each is separate from the other with its own supply of lubricant. As a consequence, a failure of a seal for the rotatable sleeve has no effect on the track hinge joint.

25 Claims, 2 Drawing Sheets

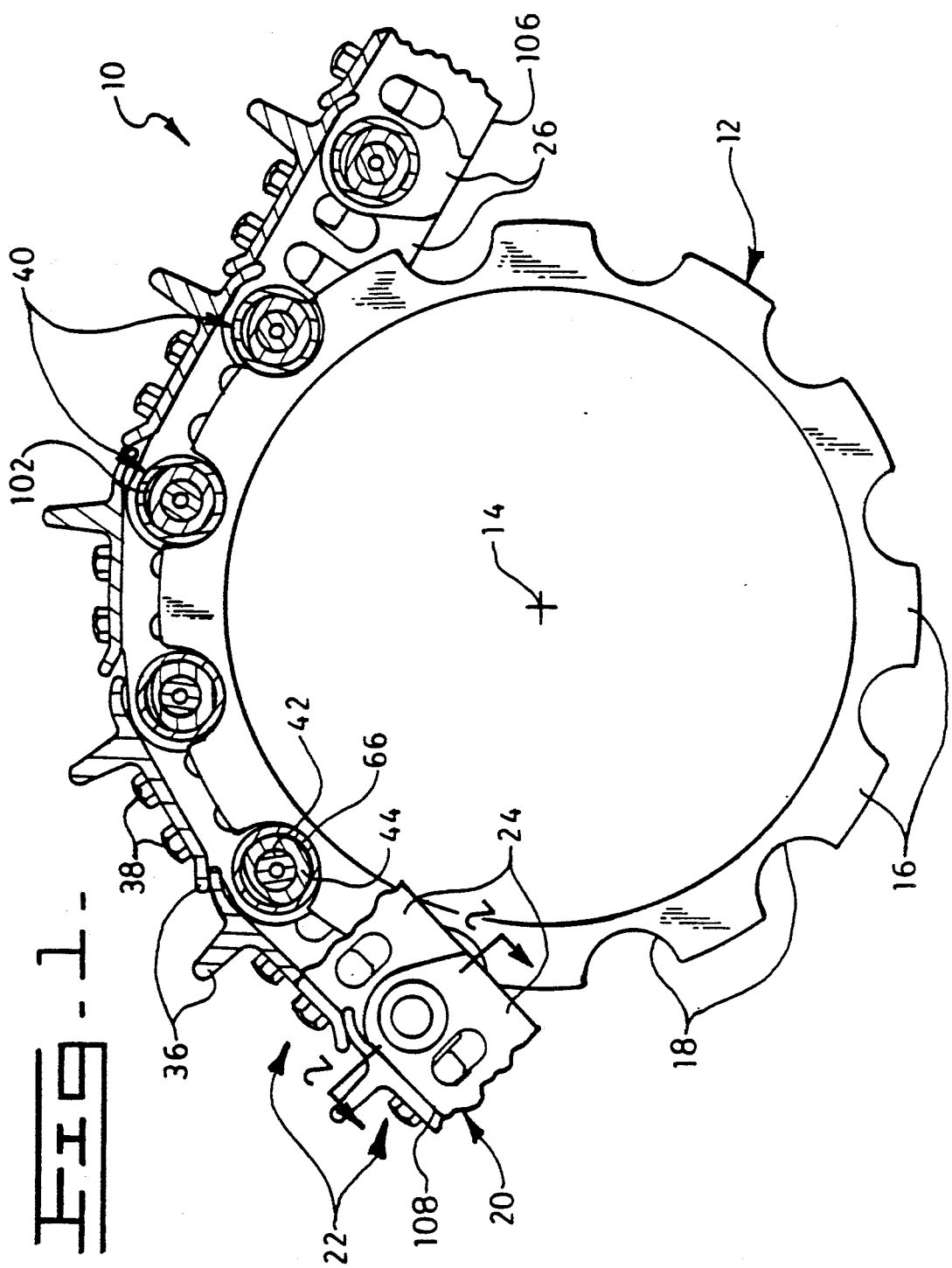

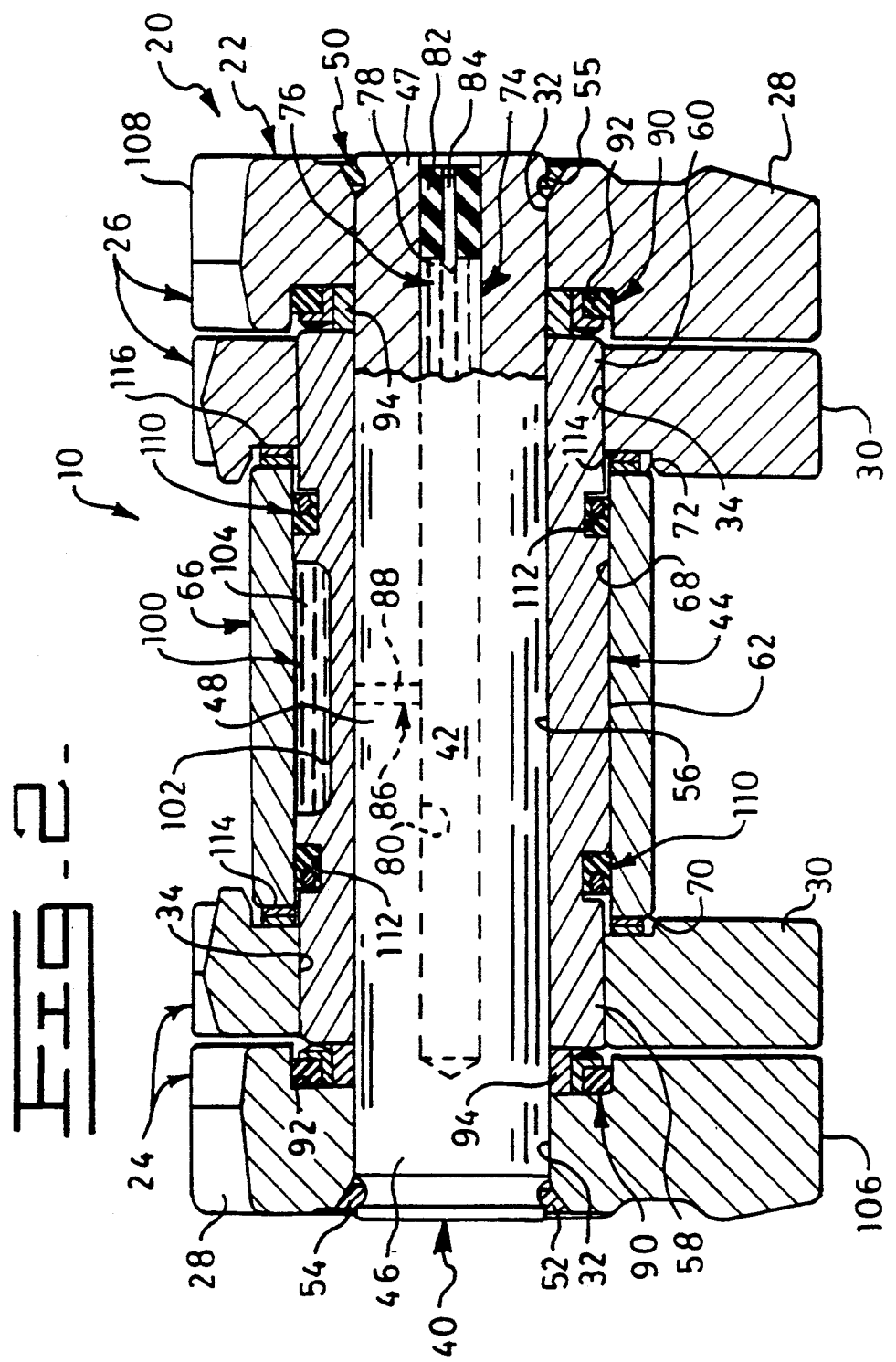

ENDLESS TRACK CHAIN WITH ROTATABLE SLEEVE

DESCRIPTION

1. Technical Field

This invention relates generally to endless track for use on track-type vehicles and the like and, more particularly, to an improved track provided with a sleeve that is rotatably mounted about the track bushing to provide the track with longer external bushing life.

2. Background Of The Invention

Conventional track for track-type tractors and the like use the track bushing as a drive member. Such track bushings engage the toothed drive sprocket of the vehicle. The large locomotive forces from the vehicle are transmitted from the drive sprocket into the track through the bushings. Because the bushings are non-rotatably fixed relative to their respective track links, there is a great amount of scrubbing action that occurs between the bushing and the sprocket as the bushing engages and disengages the toothed sprocket. Also because the bushing is fixed, only one side or portion of the bushing contacts the sprocket. Additionally, the typical working environment of such vehicles contains considerable abrasive materials such as sand, dust, dirt and mud. Because of all of this, that portion of the external surface of the bushing which engages the sprocket is subject to a high degree of wear, while the rest of the external surface of the bushing receives little or no wear at all. As a consequence, one area of the bushing wears out prematurely and the entire bushing must be replaced.

Others have attempted to overcome this excessive and uneven wear problem. One such attempt is disclosed in U.S. Pat. No. 3,492,054 for Track Hinge Joints With Rotating Bushings that issued Jan. 27, 1970 to Roger L. Boggs and is assigned to the assignee of the present invention. Most modern track, like that of the Boggs patent, is both sealed and lubricated to eliminate internal joint wear between the pin and bushing. In such sealed and lubricated track, seal reliability is critical because of the limited supply of lubricating oil contained in the hinge joint. In conventional sealed and lubricated track, each track hinge joint has two seals. Leakage of either of such seals will quickly deplete this limited oil supply. Once the supply of lubricating oil is gone, internal wear will develop and joint failure will soon follow. One problem with the rotating bushing of Boggs is that it has a single oil reservoir, like conventional track, but twice the number to seals (four versus two). A failure of any of such seals will result in early joint failure.

The present invention is directed to overcoming the shortcomings of the prior attempts at providing a track with longer external bushing life.

DISCLOSURE OF THE INVENTION

In accordance with one aspect of the present invention there is provided a track hinge joint for articulately coupling a pair of outboard link ends of a first set of links of an endless track chain to a pair of inboard link ends of a second set of adjoining links of the track chain. The joint includes a pin non-rotatably secured to the outboard link ends, a bushing rotatably received about the pin and non-rotatably secured to the inboard link ends, and a cylindrical sleeve rotatably mounted about the bushing. The joint also includes first sealing and lubricating means that is adapted to provide lubricant between the pin and bushing from a first lubricant supply, and second sealing and lubricating means that is adapted to provide lubricant between the bushing and sleeve from a second lubricant supply. The second lubricant supply is separate from the first lubricant supply.

In accordance with another aspect of the present invention, the first sealing and lubricating means includes a first pair of oil seals and the second sealing and lubricating means includes a second pair of oil seals.

BRIEF DESCRIPTION OF THE DRAWINGS

FIG. 1 is side elevational view of drive sprocket wheel and a fragmentary portion, with portions broken away and shown in section, of a track chain engaging such sprocket wheel; and FIG. 2 is an enlarged cross-sectional view taken along line 2—2 of FIG. 1 illustrating one of the hinge joints of the track chain.

BEST MODE FOR CARRYING OUT THE INVENTION

Referring more particularly to the drawings, a fragmentary portion of an endless track chain embodying the principles of the present invention is generally depicted by the reference numeral 10. The track chain 10 is shown in driven engagement with a toothed sprocket wheel 12 of a track type vehicle (not shown). The sprocket wheel 12 driven about a central axis 14 and has a plurality of alternating teeth 16 and arcuate recesses 18.

The track chain 10 includes a link assembly 20 constructed in a conventional manner from a plurality of adjoining links sets 22. Each link set includes a left-hand link 24 and a right-hand link 26 (as shown in FIG. 2). Each left- and right-hand link 24,26 has an outboard end 28 and an opposite inboard end 30. The outboard ends 28 are offset away from the center of the link assembly 20, while the inboard ends 30 are offset toward the center such that the outboard ends 28 of one link set 22 overlap the inboard ends 30 of the adjoining link set. Each outboard end 28 is provided with a pin bore 32, while each inboard end 30 is provided with a bushing bore 34. A track shoe 36 (FIG. 1) is releasably fastened by bolts 38 to respective sets of left- and right-hand links 24,26.

Adjoining link sets 22 of left- and right-hand links 24,26 are articulately joined together by a like plurality of track hinge joints 40 constructed in accordance with the present invention. As best shown in FIG. 2, each hinge joint 40 includes a pin 42 and a bushing 44. Pin 42 has opposite end link portions 46,47 and a central bushing portion 48. The opposite end link portions 46,47 are non-rotatably secured within respective ones of the pin bores 32 of the outboard link ends 28 by means of a heavy press-fit as well known in the art. Means 50 for restraining outward axial movement of the outboard ends 28 on the opposite pin end portions 46 is preferably provided to minimize joint end-play during operation of the track chain 10. Means 50 preferably includes the use of a formed-in-place retainer 52 that is deformably forced into cooperating grooves 54,55 in the outboard link ends 28 and the opposite end portions 46 of the pin 42, respectively. The method of retaining a track joint in this manner is more fully disclosed in U.S. Pat. No.

4,639,995, which is assigned to the assignee hereof and incorporated herein by this reference.

Bushings 44 each have a pin bore 56 therethrough, a pair of opposite end link portions 58,60 and an outer central sleeve portion 62. The pin bore 56 is rotatably received about the central bushing portion 48 of the pin 42 and sized to permit free pivotal movement between the pin 42 and bushing 44. Each of the opposite link portions 58,60 are non-rotatably received within respective ones of the bushing bores 34 of the inboard link ends 30, again by a heavy press-fit as is known in the art.

The track joint 40 is also provided with a cylindrical sleeve 66. Sleeve 66 has an inner bushing bore 68 and a predetermined length between opposite end surfaces 70,72 thereof. Bushing bore 68 is sized to rotatably mount the sleeve about the central sleeve portion 62 of the bushing 44. The length of the sleeve 66 is such to permit the sleeve to be rotatably received between the inboard link ends 30. Thus, the bore 68 and length are sufficient to permit free rotational movement between the sleeve 66 and bushing 44 and between the sleeve 66 and inboard link ends 30, respectively.

First sealing and lubricating means 74 are provided for lubricating the pivotable contact between the central bushing portion 48 of pin 42 and the pin bore 56 of bushing 44 and for preventing the loss of lubricant therefrom and the ingress of abrasive matter thereinto. First sealing and lubricating means 74 includes a first cavity 76 formed within the pin 42 to contain a first supply of lubricant 78, preferably an oil lubricant. First cavity 76 is preferably provided by a blind bore 80 through one end of the pin 42. Bore 80 may be closed by any suitable means, such as by a rubber stopper 82 having a centrally disposed plastic vent plug 84 secured therein. Means 86 for communicating the lubricant 78 in the first cavity 76 with the pin bore 56 of the bushing 44 and the central bushing portion 48 of the pin 42 is provided by means of a radial passage 88. First sealing and lubricating means 74 also includes a first pair of oil seals 90 for sealing the first lubricant supply 78. Each of such first oil seals 90 is preferably disposed in an annular recess 92 formed in each of the outboard link ends 28 adjacent the opposite end portions 58,60 of the bushing 44. Such seals 90 may be of any suitable type. For example, one type of seal that is commonly used in track joints and is suitable for use herein is the end face seal assembly disclosed in U.S. Pat. No. 4,262,914, which is assigned to the assignee hereof. A pair of spacer rings 94 are disposed with the recesses 92 radially inwardly of the oil seals 90 so as to be on the lubricated side of such seals. The spacer rings 94 are of a predetermined length sufficient to control the minimum axial spacing between the outboard link ends 28 and their adjacent bushing end portion 58,60. Such spacers are useful in maintaining the minimum axial length of the recess 92 to prevent crushing of the seals 90 upon assembly or during operation of the track chain 10.

Second sealing and lubricating means 100 are provided for lubricating the pivotable contact between the outer central sleeve portion 62 of bushing 44 and the bushing bore 68 of sleeve 66 and for preventing the loss of lubricant therefrom and the ingress of abrasive matter thereinto. Second sealing and lubricating means 100 includes a second cavity 102 formed in the bushing 44 to contain a second supply of lubricant 104, also preferably an oil lubricant. Second cavity 102 is shown in FIG. 1 with a crescent shaped cross-sectional configuration. However, other cavity configurations, such as a chordal shape, may be used as well. The crescent shaped cavity 102 is open to the bushing bore 68 of the sleeve 66 and the outer central sleeve 62 of the bushing 44 and is separate from the first cavity 76 and the first lubricant supply 78. As more readily apparent from FIG. 1, the links 24,26 each have an inner rail surface 106 and an outer track shoe mounting surface 108. Cavity 102 is located on the side of the bushing 44 adjacent the track shoe 36. Stated another way, the cavity 102 is disposed on the side of the bushing 44 that is opposite the rail surface 106 and facing the track shoe mounting surface 108. Referring again to FIG. 2, the second sealing and lubricating means 100 includes a second pair of oil seals 110. To accommodate such seals, the bushing 44 is provided with a pair of annular grooves 112 in its outer central sleeve portion 62 that are spaced on opposite sides of the second cavity 102. One of said second oil seals 110 is disposed within respective ones of the grooves 112 for sealing between the outer central sleeve portion 62 of the bushing 44 and the inner bore 68 of the sleeve 66. The second seals 102 may be of any suitable type. An O-Ring loaded U-Cup seal sold by Greene Tweed and Company of Kulpsville, Pa., has been used with satisfactory results in this application.

The second sealing and lubricating means 100 also preferably includes a pair of dust seals 114. The dust seals 114 are each disposed an annular recess 116 in each of the inboard link ends 30 adjacent their respective opposite end surfaces 70,72 of the sleeve 66. The dust seals 114 are disposed in sealing relationship between the sleeve end surfaces 70,72 and the inboard link ends 30 outboard of a respective one of the second oil seals 110 to minimize the oil seal's exposure to abrasive matter. The dust seals are preferably of the steel belleville washer type that have long been used in non-lubricated track.

Industrial Applicability

The track joint 40 constructed in accordance with the teachings of the present invention provides the track chain with extended wear life and reduced costs for maintenance. As is readily apparent for the foregoing, the track joint 40 is provided with a rotatable sleeve 66 which turns about the bushing 44. This enables the sleeve to remain stationary with respect to the toothed sprocket wheel 12 during the sleeve's driven engagement with the sprocket wheel and as it engages with and disengages from such sprocket wheel. Those skilled in the art will appreciate that this will eliminate the customary scrubbing action that occurs between the prior art bushings and sprocket wheels. As a consequence, the high rate of frictional wear that would normally occur due to such relative movement in the presence of abrasive matter and under load is greatly reduced. Also, wear that does occur is uniformly distributed about the entire circumference of the bushing and not just in one location as occurs in the fixed bushings of prior art track joints. These important advantages are achieved in the present invention without detrimentally effecting the life of the sealed and lubricated portion of the joint 40 between the pin 42 and the bushing 44. This is accomplished by providing the first sealing and lubricating means 74 for the joint interface between the pin 42 and the bushing 44 and a second sealing and lubricating means 100 for the joint interface between the sleeve 66 and the bushing 44. The first sealing and lubricating means 74 has a first supply of lubricant 78, while the second sealing and lubricating means 100 has its own supply of lubricant 104 which is completely separate and distinct from the first lubricant supply 78. As a consequence, any failure that may occur in the second sealing and lubricating means 100 will have no effect on the first sealing and lubricating means 74, nor will it deplete the first lubricant supply. Thus, the inclusion of additional seals in the joint, which are necessitated by the addition of the rotating sleeve, will not add to the failure rate of the portion of the joint sealed by the first sealing and lubricating means. As previously described, the crescent shaped second cavity 102 is oriented toward the track shoe 36 and away from the rail surface 106. This orientation of the cavity 102 is beneficially chosen so as not to reduce the area of bearing contact between the bushing and the sleeve. Such bearing contact occurs toward the rail surface 106 as this is the direction of contact between the sleeve 66 and the sprocket wheel 12.

Other aspects, objects and advantages of the invention can be obtained from a study of the drawings, the disclosure and the appended claims.

We claim:

1. A track hinge joint for articulately, coupling a pair of outboard link ends of a one set of links of an endless track chain to a pair of inboard link ends of an adjoining set of links of said track chain, said joint comprising:
   a pin non-rotatably secured to said outboard link ends;
   a bushing rotatably received about said pin and non-rotatably secured to said inboard link ends;
   a cylindrical sleeve rotatably mounted about said bushing;
   first means for sealing and lubricating said joint, said first lubricating means having a first supply of lubricant and for supplying said lubricant between the pin and bushing; and
   second means for sealing and lubricating said joint, said second lubricating means having a second supply of lubricant for supplying said lubricant between the bushing and sleeve, said second lubricant supply being separate from said first lubricant supply.

2. The track joint of claim 1 wherein said first sealing and lubricating means includes a first pair of oil seals.

3. The track joint of claim 2 wherein said second sealing and lubricating means includes a second pair of oil seals.

4. The track joint of claim 3 wherein said sleeve has a bushing bore, said bushing has an outer central sleeve portion received within said bushing bore and a pin bore, and said pin has a central bushing portion received within said pin bore; and
   wherein said first sealing and lubricating means includes a first cavity formed within said pin to contain said first supply of lubricant and means for communicating said cavity with the pin bore of said bushing and the mating bushing portion of said pin, and said second sealing and lubricating means includes a second cavity formed in said bushing to contain said second supply of lubricant, said second cavity being open to the bushing bore of said sleeve and the outer central sleeve portion of said bushing.

5. The joint of claim 4 wherein said bushing has opposite end portions and each outboard link end has an annular recess therein adjacent a respective one of the bushing end portions, one of said first pair of seals being disposed within a respective one of said recesses and sealing against its adjacent bushing end portion.

6. The joint of claim 5 wherein said joint includes a pair of spacer rings, one of said spacer rings being disposed within a respective one of said link end recesses and radially inwardly of the respective one of said first pair of seals, said rings being of a length sufficient to control the minimum axial spacing between said outboard link end and the adjacent end portion of said bushing.

7. The track joint of claim 4 wherein said bushing includes a pair of annular grooves in its outer central sleeve portion, said grooves being spaced on opposite sides of said second lubricant cavity in said bushing, each of said second seals being disposed within a respective one of said grooves and sealing between the outer central sleeve portion of said bushing and the bushing bore of said sleeve.

8. The track joint of claim 7 wherein said second sealing and lubricating means includes a pair of dust seals, each dust seal being disposed outboard of a respective one of said second oil seals and in sealing relationship between said sleeve and an adjacent one of said inboard link ends.

9. The track joint of claim 8 wherein said sleeve has opposite end surfaces, said inboard link ends each have a recess adjacent a respective one of said opposite end surfaces and said pair of dust seals each include a pair of belleville washers disposed within respective ones of said recesses.

10. The track joint of claim 9 wherein each of said link sets have an inner rail surface and an outer track shoe mounting surface thereon, and wherein said second lubricant cavity in said bushing has a generally crescent shaped cross-sectional configuration and is disposed on the side of said bushing that is opposite said rail surface and facing said track shoe mounting surface.

11. A track hinge joint, comprising:
   a pair of outboard link ends, each having a pin bore therethrough;
   a pair of inboard link ends, each having a bushing bore therethrough;
   a pin having opposite end link portions and a central bushing portion, said link portions being non-rotatably secured within respective ones of said pin bores of said outboard link ends;
   a bushing having a pin bore therethrough, a pair of opposite end link portions and an outer central sleeve portion, said pin bore being rotatably received about the central bushing portion of said pin and said opposite link portions of the bushing each being non-rotatably received within a respective one of the bushing bores of said inboard link ends;
   a cylindrical sleeve disposed about said bushing and between said inboard link ends, said sleeve having an inner bore and a predetermined length, said inner bore being sized to rotatably mount the sleeve about the central sleeve portion of said bushing and said length being sufficient to permit the sleeve to be rotatably received between said inboard link ends;
   first means for sealing and lubricating said joint, said first sealing and lubricating means, including a first cavity formed within said pin to contain a first supply of lubricant and means for communicating said lubricant with the pin bore of said bushing and the central bushing portion of said pin; and second means for sealing and lubricating said joint, said second sealing and lubrication means including a second cavity formed in said bushing to contain a second supply of lubricant, said second cavity being open to the bushing bore of said sleeve and the outer central sleeve portion of said bushing and said second supply of lubricant being separate from said first supply of lubricant.

12. The track joint of claim 11, wherein said first sealing and lubricating means includes a first pair of oil seals for sealing said first lubricant supply and said second sealing and lubricating means includes a second pair of oil seals for sealing said second lubricant supply.

13. The track joint of claim 12, wherein said outboard link ends each have an annular recess therein adjacent a respective one of the opposite bushing end portions, and wherein one of said first pair of oil seals is disposed in a respective one of said recesses and in sealing engagement against its adjacent bushing end portions.

14. The joint of claim 13 wherein said joint includes a pair of spacer rings, one of said spacer rings being disposed within a respective one of said outboard link end recesses and radially inwardly of the respective one of said first pair of seals, said rings being of a length sufficient to control the minimum axial spacing between said outboard link end and the adjacent end portions of said bushing.

15. The track joint of claim 14 wherein said bushing includes a pair of annular grooves in the outer central sleeve portion of said bushing and spaced on opposite sides of said second lubricant cavity in said bushing, each of said second seals being disposed within a respective one of said grooves and sealing between the outer central sleeve portion of said bushing and the inner bore of said sleeve.

16. The track joint of claim 15 wherein said second sealing and lubricating means includes a pair of dust seals, each dust seal being disposed outboard of a respective one of said second oil seals and in sealing relationship between said sleeve and an adjacent one of said inboard link ends.

17. The track joint of claim 16 wherein said sleeve has opposite end s said inboard link ends each have a recess a respective one of said opposite end surfaces and said pair of dust seals each include a pair of belleville washers disposed within respective ones of said recesses.

18. The track joint of claim 17 wherein each of said links has an inner rail surface and an outer track shoe mounting surface thereon, and wherein said second lubricant cavity in said bushing has a generally crescent shaped cross-sectional configuration and is disposed on the side of said bushing that is opposite said rail surface and facing said track shoe mounting surface.

19. An endless track chain for track-type vehicles, comprising:
a link assembly including a plurality of adjoining link sets, each link set having a right-hand link and a left-hand link, each right- and left-hand link having an outboard end and an opposite inboard end that is overlapped by the respective opposite outboard end of the link in the adjoining link set of the link assembly, each outboard link end having a pin bore therethrough and each inboard link end having a bushing bore therethrough;
a plurality of track shoes, one of which is releasably fastened to each of said link sets;
a plurality of hinge joints for articulately coupling each link set to its adjoining link set, each hinge joint comprising;
a pin having opposite end link portions and a central bushing portion, said link portions being non-rotatably secured within respective ones of said pin bores of said outboard link ends;
a bushing having a pin bore therethrough, opposite end link portions, and an outer central sleeve portion, said pin bore being rotatably received about the central bushing portion of said pin and said opposite end link portions of the bushing each being non-rotatably received within a respective one of the bushing bores of said inboard link ends;
a cylindrical sleeve having an inner bushing bore and being rotatably disposed about said bushing and between said inboard link ends;
first means for sealing and lubricating said joint, said first sealing and lubricating means including a first cavity formed within said pin to contain a first supply of lubricant and means for communicating said lubricant with the pin bore of said bushing and the central bushing portion of said pin; and
second means for sealing and lubricating said joint, said second sealing and lubrication means including a second cavity formed in said bushing to contain a second supply of lubricant, said second cavity being open to the bushing bore of said sleeve and the outer central sleeve portion of said bushing and said second supply of lubricant being separate from said first supply of lubricant.

20. The track chain of claim 19, wherein said first sealing and lubricating means includes a first pair of oil seals for sealing said first lubricant supply and said second sealing and lubricating means includes a second pair of oil seals for sealing said second lubricant supply.

21. The track chain of claim 20 wherein said bushing includes a pair of annular grooves in the outer central sleeve portion of said bushing and spaced on opposite sides of said second lubricant cavity in said bushing, each of said second seals being disposed within a respective one of said grooves and sealing between the outer central sleeve portion of said bushing and the inner bore of said sleeve.

22. The track chain of claim 21 wherein said second sealing and lubricating means includes a pair of dust seals, each dust seal being disposed outboard of a respective one of said second oil seals and in sealing relationship between said sleeve and an adjacent one of said inboard link ends.

23. The track chain of claim 22 wherein said sleeve has opposite end surfaces, said inboard link ends each have a recess adjacent a respective one of said opposite end surfaces and said pair of dust seals each include a pair of belleville washers disposed within respective ones of said recesses.

24. The track chain of claim 23 wherein said second lubricant cavity is formed in the outer central sleeve portion of said bushing and has a generally crescent shaped cross-sectional configuration, said second cavity being disposed on the side of said bushing adjacent its respective track shoe.

25. The track chain of claim 24 including means for restraining the outward axial movement of said outboard link ends on opposite end link portions of said pin.

* * * * *

UNITED STATES PATENT AND TRADEMARK OFFICE
CERTIFICATE OF CORRECTION

PATENT NO. : 5,069,509

DATED : December 3, 1991

INVENTOR(S) : MARK L. JOHNSON ET AL.

It is certified that error appears in the above-identified patent and that said Letters Patent is hereby corrected as shown below:

Claim 1, column 5, line 23, after "articulately", delete ",".

Claim 17, column 7 line 43, after "end", delete "s" and insert --surfaces,--.

Claim 17, column 7 line 43, after "recess", insert --adjacent--.

Signed and Sealed this

Thirtieth Day of March, 1993

Attest:

STEPHEN G. KUNIN

Attesting Officer

Acting Commissioner of Patents and Trademarks